United States Patent Office 3,137,689
Patented June 16, 1964

3,137,689
6-ALPHA METHYL PREGNENOLONES AND METHOD OF PREPARATION
Ralph I. Dorfman, Marcel Gut, Bjarte Löken, and Miasnig Hagopian, all of Shrewsbury, Mass., assignors to Worcester Foundation for Experimental Biology, Shrewsbury, Mass., a non-profit foundation of Massachusetts
No Drawing. Filed Apr. 23, 1962, Ser. No. 189,288
12 Claims. (Cl. 260—239.55)

This invention relates to 6-alpha-methyl-3-beta-hydroxypregn-4-en-20-one, to its 3-beta-acyloxy esters derived from a carboxylic acid having from 1 to 10 carbon atoms, to their 20-lower alkylene ketals, novel intermediate compounds useful in their preparation, and to an improved method of formation.

The 6-alpha-methyl-3-beta-hydroxypregn-4-en-20-one (IV) is found to have high anti-ovulatory activity, and to a lesser degree, but active over longer periods, the 3-beta-acyloxy esters in which the acyl group has from 1 to 10 carbon atoms and is derived from a carboxylic acid; and their lower alkylene ketals.

The anti-ovulatory compounds hereof may be illustrated by the following formula:

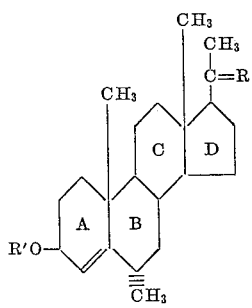

wherein R is ketonic oxygen or a lower alkylene, such as ethylene or propylene, ketal and R' is hydrogen or a 1 to 10 carbon atom hydrocarbon acyl derived from a carboxylic acid. The 20-lower alkylene ketals of this formula are useful intermediates when prepared according to the method of example 3 below.

The hydrocarbon acyl group containing from 1 to 10 carbon atoms derived from a carboxylic acid may include radicals illustrated by the following: formyl, acetyl, acrylyl, propionyl, butyryl, dimethyl acetyl, valeryl, caproyl, heptanoyl, octanoyl, cyclopentanoyl, cyclohexyl formyl, benzoyl, phenyl acetyl, toluoyl, 3,4-dimethyl, naphthoyl, and the like.

The compounds of the formula given above may be prepared by first forming the 20-lower alkylene ketal of 3-beta-hydroxy-6-methylpregn-5-en-20-one, or its 3-acyloxy derivative. 6-methylpregnenolone is readily available from 6-methyldiosgenin by known methods. 6-methylpregnenolone 20-ethylene ketal is also available from dehydroepiandrosterone (or its 3-acyloxy derivative via the intermediate 3-beta-5-alpha-dihydroxy-6-beta-methylpregnan-20-one described by Miramontes and co-workers (J. Am. Chem. Soc. 82, 6155 (1960)). This compound, preferably as the 3-beta-acylated derivative gives, when subjected to the transketalization conditions, 2-methyl-2-ethyl-1,3-dioxolane containing .2% p-toluenesulfonic acid, 6-methylpregnenolone 20-ethylene ketal or its 3-beta-acylate (Hyp. J. Dauben and co-workers, Am. Chem. Soc. 76, 1359 (1954)). During this ketalization procedure there occurs a simultaneous elimination of water from carbons 5 and 6. This is another important process feature of this invention, illustrated by the examples which follow below.

The 20-lower alkylene ketal derivative of 6-methylpregnenolone can be formed in excellent yield by heating with the appropriate glycol (ethylene or propylene glycol) in the presence of an acid catalyst such as p-toluenesulfonic acid. The water which is formed as a result of the condensation reaction is conveniently removed from the reaction mixture by azeotropic distillation with benzene.

If the 20-lower alkylene ketal derivative is an ethylene ketal, the same result is obtained using acid catalyzed transketalization described by Hyp. J. Dauben and co-workers, supra.

Where the 3-acylate has been used as a starting material for the ketal, it is necessary to hydrolyze this group to the 3-beta-hydroxy-20-ketal, which is then oxidized with cyclohexanone and aluminum isopropoxide, or aluminum tert. butoxide to the corresponding 3-ketone, which after alkaline treatment isomerizes to the 6-alpha-methylprogesterone 20-lower alkylene ketal, by migration of the double bond from the 5,6-position to the 4,5-position, followed by an epimerization of the 6-beta-methyl group to the 6-alpha-position, which is the thermodynamically more stable position. Quite serious complications arise from the presence of the 6-methyl group. First, the reaction time in the Oppenauer type oxidation needs to be prolonged. Second, the isomerization and epimerization is generally carried out with acid. If the 6-methyl group were not present, this could be achieved with an acid wash which also removes the aluminum salt as water solubles. When the 6-methyl group is present, together with acid sensitive groups, such as the ketal moiety, acid treatment would obviously lead to hydrolysis and loss of such important blocking groups. It was found that one half hour heating with aqueous sodium or potassium carbonate after completion of the reaction effectively shifted the double bond from position 5 to 4, and at the same time cleaved the aluminum complex to form an aqueous suspension of aluminum hydroxide, which could be separated and reextracted with toluene. This extract could be steam distilled to remove the cyclohexanone condensation products and solvents, however only in the presence of aqueous alkali metal carbonate solution, which effectively protected the ketal group from hydrolytic cleavage. The 6-methylprogesterone 20-monoethylene ketal so isolated had an optical rotation at +60° to +64°, indicating a 1:1 mixture of the 6α- and 6β-epimers. It was found that this mixture very efficiently could be epimerized to the desired 6α-epimer by refluxing for 1½ hours in a 5% solution of diethylamine in methanol. Other bases can be used, but diethylamine is most convenient because it boils below methanol, which greatly contributes to facile isolation of the epimerization product by simple concentration on the steam bath, preferably under reduced pressure. The base is removed with the vapors and the stereochemically pure 6α-methyl progesterone 20-monoketal crystallizes directly from the residual methanol upon cooling. The importance of having a stereochemically pure intermediate is emphasized, as no cumbersome chromatographic separation is necessary in the subsequent step.

This pure thermodynamically more stable 6-alpha epimer of the 6-methylprogesterone 20-lower alkylene ketal is then reduced with lithium aluminum hydride, lithium borohydride, sodium borohydride or a similar metal hydride, or with alkali metal and alcohol to the 20 ketal, the 3-beta-hydroxy-6-alpha-methylpregn-4-en-20-one, 20-alkylenedioxy or 20-dialkyldioxy which in itself exhibits the claimed activity, but which also can be further hydrolyzed to give the 3-beta-hydroxy-6-alpha-methylpregn-4-en-20-one. The 3-beta-ol can then be converted to the 3-acyloxy ester by reaction with the acid anhydride of the acyl radicals to be introduced. Alternatively, the 3-acyloxy group can be introduced by treatment with the acid anhydride before hydrolyzing of the 20-ethylene ketal group. The 20-lower alkylene ketals do not need to be hydrolyzed but the 3-beta-hydroxy-20-ketal compounds or the beta acyloxy compounds can be used in the form of their 20-lower-alkylene ketals, preferably their 20-ethylene ketals. By the procedure described in our patent application, that 20-ketal hydrolysis is effected without hydrolysis of the ester group and without inversion of the allylic structure to delta-5-compounds by use of dilute ethanolic-oxalic acid or by refluxing in aqueous methanol or dioxane.

In an alternate new procedure, we have found that the 3-beta-hydroxy - 6 - alpha-methylpregn-4-en-20-one compound may be prepared from 6-alpha-methyl-17-alpha-acetoxyprogesterone (Upjohn's Provera) as a starting material by applying a Serini-Logemann reaction (after a hydride reduction, followed by acetylation) to convert the 17-alpha and 20-hydroxy groups into a 20-ketone, thus obviating the need for a selective reduction of a 3,20-diketo precursor or the selective oxidation of a 3,20-diol according to the following scheme:

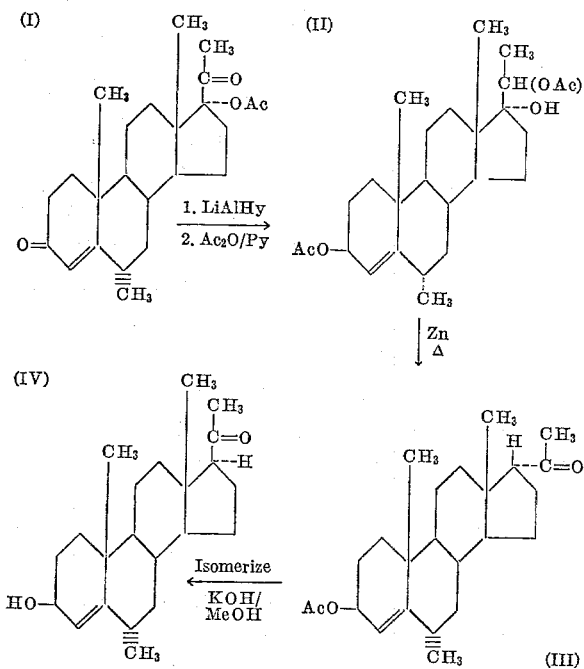

As shown in this scheme, a solution of Provera (I) in tetrahydrofuran may be added dropwise to a solution of lithium aluminum hydride in diethyl ether and stirred overnight at room temperature. The crude intermediate reduction product, the 3,17,20-triol, was acetylated with acetic anhydride and pyridine to give the 3,20-diacetoxy derivative, 3-beta-17-alpha,20 - trihydroxy-6-methylpregn-4-ene 3,20-diacetate (20-isomeric mixture), (II). The structure of the Compounds II is consistent with infrared and ultra-violet spectral data. The mixture can be purified by chromatography, but as intermediate in the present preparation in which both isomers are useful, the crude mixture may be directly subjected to the Serini-Logemann reaction without any separation.

SERINI-LOGEMANN REACTION

The 3,20-diacetate (II) in the Serini-Logemann reaction was first mixed thoroughly with 20 times excess by weight of zinc dust. This mixture was then placed in a sublimation tube and slowly heated in an oil bath at reduced pressure. The sublimate deposited on the cold finger between 150 and 180° C. at 0.5 to 0.1 mm. Hg pressure. The Serini reaction proceeds by reaction of an acetic acid ester group and by inversion of the groups at $C_{17}$ as shown in the formulation above. The resulting compound 3-beta-acetoxy-6-alpha - methyl-17-isopregn-4-en-20-one (III) has a relatively less stable 17-alpha-sidechain and is readily isomerized to the more stable form in the next step. The attempts to crystallize the Serini product, Formula III, were not successful, even with chromatography. The sublimate III was finally subjected to equilibration by refluxing under nitrogen for two hours in a 5% KOH solution in methanol. The desired reaction product, 3-beta-hydroxy-6-alpha-methylpregn-4-en-20-one (IV) was crystallized from an ether extract in an overall yield of 20%. Oxidation of the Compound IV with $MnO_2$ gave a $\Delta^4$-3-keto compound found to be identical with an authentic sample of 6-alpha-methylprogesterone.

The following examples illustrate the practice of this invention:

Example 1

A. 6-ALPHA-METHYLPREGN-4-EN-3-BETA - 17 - ALPHA-20-TRIOL 3-BETA-20-DIACETATE (20-ISOMERIC MIXTURE)

A solution of 3.3 grams of 6-alpha-methyl-17-alpha-acetoxy-progesterone (I) in 200 ml. of tetrahydrofuran was added dropwise to a suspension of 3 grams of lithium aluminum hydride in 150 ml. of diethyl ether. The reaction flask in an ice bath was stirred magnetically while the addition was made and then allowed to stand at room temperature overnight. Thereafter, the solution was worked up by adding an excess of ethyl acetate dropwise followed by a saturated sodium sulfate solution until the suspended inorganic salts separated as a cake from the clear supernatant solution. The solvent was removed in vacuo from the filtered organic phase. No high intensity absorption in the ultra-violet showed in the crude crystalline residue nor any absorption in the $6\mu$ region of its infrared spectrum, indicating complete reduction of all carbonyl and ester groups to the respective hydroxyls. This solution of the 3,17,20-triols was acetylated in 30 ml. of pyridine and 6 ml. of acetic anhydride overnight at room temperature. Evaporation in vacuo of the pyridine and the excess acetic anhydride afforded a clear, glassy syrup which could be purified further by chromatography to yield 6-alpha-methylpregn - 4 - ene-3-beta-17-alpha, 20-alpha-and 20-beta-triol 3,20-diacetate (II).

B. 3-BETA-ACETOXY-6-ALPHA-METHYL-17-ISOPREGN-4-EN-20-ONE III

[Serini-Logemann Reaction]

A 1.3 g. portion of the crude 3,20-diacetate (II) (limited by capacity of sublimation apparatus) was mixed thoroughly with 22 g. of zinc dust by means of a mortar and pestle. This dry mixture was placed in a sublimation tube which was specially designed with an enlarged base. The sublimation vessel was evacuated with a hi-vac pump and slowly heated in an oil bath. The cold finger showed a deposit of white sublimate at approximately 150° C. oil bath temperature at a pressure of 0.5 to 0.1 mm. Hg (measured with a Hasting's gauge). The temperature was allowed to rise slowly to 180° C. at which point a heavy sublimate was visible and the heating was terminated. The sublimate was scraped off the cold finger and dissolved in diethyl ether and filtered. A portion of the sublimate was insoluble in ether. The infrared spectrum of this insoluble solid was identical with that of zinc acetate which is an expected reaction product of the Serini reaction. The ether soluble fraction yielded 1.01 g. of a colorless syrup which failed to crystallize after repeated attempts.

Anal.—Calc'd for $C_{24}H_{36}O_3$: C, 77.37; H, 9.74. Found: C, 77.51; H, 10.01. No UV absorption from 230 to 300$\mu$ and bands in the IR at 1735 and 1250 (ester), 1650 (double bond) and 1710 cm.$^{-1}$ (sat. ketone).

C. 3-BETA-HYDROXY-6-ALPHA-METHYLPREGN-4-EN-20-ONE (IV)

The Serini product III of Example 1B which had the less stable, unnatural 17-alpha-side chain was isomerized by refluxing in a 5% KOH in methanol solution under nitrogen for two hours. The isomerized material was crystallized from diethyl ether to yield the desired allylic 3-hydroxyl compound with the side chain in the normal 17-beta position in about 20% overall yield.

A recrystallized analytical sample had an M.P. 133–137° C.

$$[\alpha]_D^{20}(MeOH) +109° +3°$$

Anal.—Calc'd for $C_{22}H_{34}O_2$: C, 79.95; H, 10.37. Found: C, 80.13; H, 10.53. Oxidation of a sample of the above with manganese doxide in methylene chloride at room temperature yielded 6-alpha-methylprogesterone as shown by comparison of its melting point and infrared spectrum with an authentic sample.

*Example 2*

3-BETA-ACETOXY-6-ALPHA-METHYLPREGN-4-EN-20-ONE

The 3-hydroxy Compound IV of Example 1C was acetylated by adding 2 grams to a solution of 20 ml. pyridine containing 5 ml. of acetic anhydride. The pyridine and excess acetic anhydride were removed in vacuo and the glassy residue was recrystallized from diethyl ether. 132 to 135° C. M.P.

Anal.—Calc'd for $C_{24}H_{36}O_3$: C, 77.37; H, 9.74. Found: C, 77.03; H, 9.99.

Following the procedure of this example but substituting as esterifying agents for the acetic anhydride of this example, caproic anhydride, phenyl acetic anhydride, benzoic anhydride, formic anhydride, acrylic anhydride, propionic anhydride, butyric anhydride, dimethyl acetic anhydride, valeric anhydride, heptanoic anhydride, octanoic anhydride, cyclopentanoic anhydride, cyclohexyl formic anhydride, toluoic anhydride, and naphthoic anhydride, there was obtained the caproic, phenyl acetic, benzoic, formic, acrylic, propionic, butyric, dimethyl acetic, valeric, heptanoic, octanoic, cyclopentanoic, cyclohexyl formic, toluic, 3,4-dimethyl benzoic and naphthoic 3-beta esters of Compound IV, respectively.

*Example 3*

A. 3-BETA-HYDROXY-6-METHYLPREGN-5-EN-20-ONE 20-ETHYLENE KETAL

To a solution of 10 g. of 3-beta-hydroxy-6-methyl-pregn-5-en-20-one in 300 ml. of 2-methyl-2-ethyl-1,3-dioxolane was added 120 mg. p-toluenesulfonic acid monohydrate, and heated in a 500 ml. flask, equipped with a packed column having a total reflux-partial take-off head, corresponding to approximately 40 theoretical plates when under total reflux. The mixture was heated to boiling and the reflux ratio maintained at about 1:60 for a period of 24 hrs. In the beginning of the period the temperature at the top of the column was 79°, which is the boiling point of butanone, being removed from the reaction mixture and thus displacing the equilibrium in the desired direction. At the end of the reaction period the boiling point at the top of the column was 116°, indicating that the distillate was pure methyl-ethyl-di-oxoxolane and that the reaction was complete.

The solution was cooled, transferred to a separatory funnel, and washed twice with 100 ml. each of 2N sodium carbonate solution. Finally the dioxolane layer was dried over anhydrous potassium carbonate and concentrated to dryness in vacuo.

The residue was crystallized from methanol containing one drop of diethylamine to give 8.4 g. of 3-beta-hydroxy-6-methylpregen-5-en-20-one 20-ethylene ketal. The infrared spectrum of this substance did not shown any absorption in the 6μ region. A recrystallized sample melted at 157–159° C., with prior softening.

$$[\alpha]_D^{22}, -57° \text{ (chloroform)}$$

Analysis.—Calc'd for $C_{24}H_{38}O_3$: C, 76.96; H, 10.23. Found: C, 76.80; H, 10.31.

B. 6-ALPHA-METHYLPROGESTERONE 20-ETHYLENE KETAL 10 g. of crude 6-alpha-methylpregnenolone ethylene ketal were dissolved in 300 ml. toluene, 70 ml. of cyclohexanone was added and then approximately 50 ml. of solvent mixture was distilled off to remove moisture. During continued slow distillation a solution of aluminum isopropoxide (5 g. in 35 ml. of toluene) was added during a period of about 10 minutes and the mixture allowed to boil for an additional 90 minutes. During this period the heat was regulated such, that 100–120 ml. of solvent mixture distilled off. The contents of the flask were cooled to about 30–40° C. 100 ml. of 2N aqueous sodium carbonate solution were added, and the vigorously agitated mixture heated on the steam bath for about 30–40 minutes. During this procedure the aluminum complex was cleaved to form a suspension of aluminum hydroxide which stayed for the most part in the lower aqueous layer, which was separated after transfer to a separatory funnel. The toluene layer was reextracted twice with 100 ml. of 2N aqueous sodium carbonate. The aqueous layers were combined and reextracted twice with each 150 ml. of toluene. The toluene extracts were combined, 50 ml. of aqueous 2N sodium carbonate solution added, and the solvents were removed by direct steam injection, which also effectively removed the cyclohexanone condensation products. The steam injection was continued until no more oily material separated in a sample of the distillate, which was the case after approximately 3 hours.

The residual oily material was decanted and taken up in hexane, some impurities from the steam line were filtered off, and the filtrate concentrated to about 90–100 ml. and left overnight in the deepfreeze to crystallize. The crystalline material was filtered, washed with a little hexane-ether. After drying the material weighed 8.65 g., M.P. about 140–151° C.; $[\alpha]_D^{22}$ +64° (chlf.). The infrared spectrum exhibited bands at 9.5 and 10.5μ, and the characteristic bands of α,β-unsaturated carbonyl in the 5.95 and 6.12μ region. It showed absence of hydroxyl and nonconjugated carbonyl bands. On the basis of this evidence, it was concluded that the product isolated was 6-methylprogesterone 20-ethylene ketals (6-epimeric mixture).

*Epimerization.*—8.6 g. of the 6-epimeric mixture obtained was refluxed for 90 minutes in a solution of methanol (250 ml.) and diethylamine (12.5 ml.). The solution was concentrated to a small volume under reduced pressure, and the crystalline material isolated by filtration. Some colored side products stayed in solution in the methanol filtrate. The solids were washed with cold ether and dried. 7.5 g. of material were obtained M.P. 169–174° C.; $[\alpha]_D^{22}$ +79° (chlf.). One recrystallization from ether provided the analytical sample: M.P. 173–174.5° C.; $[\alpha]_D^{22}$ +80° (chlf.). The infrared spectrum showed bands at 9.5 and 10.5μ, and the characteristic bands of α,β-unsaturated carbonyl in the 5.95 and 6.12μ region. Hydroxyl and nonconjugated carbonyl bands were absent. On the basis of this evidence it was concluded that the product isolated was the pure 6α-methylprogesterone 20-ethylene ketal. The identity was further confirmed by elemental analysis, ultraviolet spectrum (log ε, 423 at $\lambda_{max.}$, 240μ (methanol)), as well as subjecting the compound to 17 hours' reaction in acetone containing 1% p-toluenesulfonic acid monohydrate, which gave 6α-methylprogesterone, M.P., 122–123° C.; $[\alpha]_D^{22}$ +178° (chlf.), and no depression in melting point was observed upon admixture with an authentic specimen.

C. 3-BETA-HYDROXY-6-ALPHA-METHYLPREGN-4-EN-20-ONE 20-ETHYLENE KETAL 2 grams of 6-alpha-methylprogesterone 20-ethylene ketal (Example 3B) were dissolved in 40 cc. of ethanol, and 1 gram of sodium borohydride was added in small portions with magnetic stirring. After allowing to stand overnight, water was added, the ethanol was evaporated off in vacuo and the mixture was filtered and recrystallized from ethanol resulting in 1.8 grams of colorless prisms melting at about 160–165° C. Infrared analysis indicated the presence of hydroxyl and the absence of ketone and ketal bands in the 9.5 and 10.5μ region. Further crystallization from ethanol containing diethylamine gave prismatic crystals identified as 3-beta-hydroxy-6-alpha-methylpregn-4-en-20-one-20-ethylene ketal: Melting point 171–172° C.; $[\alpha]_D^{21}$, +36.5° (chlf.).

*Analysis.*—Percent calculated for $C_{24}H_{38}O_3$: Carbon, 76.96; Hydrogen, 10.23. Found: Carbon, 76.90; Hydrogen, 10.29.

D. 3-BETA-HYDROXY-6-ALPHA-METHYLPREGN-4-EN-20-ONE (IV)

Three hundred mg. of crude 3-beta-hydroxy-6-alpha-methylpregn-4-en-20-one 20-ethylene ketal (Example 3C) were dissolved in 20 cc. of 0.08% ethanolic oxalic acid solution and allowed to stand for 16 hours at 25° C. Alternatively, the ketal could be hydrolyzed by refluxing it overnight in either aqueous dioxane or methanol. Then the mixture was neutralized with concentrated aqueous ammonia solution, the ethanol was evaporated in vacuo and the resulting crystallisate was filtered off. After chromatography on aluminum oxide and recrystallization, 215 mg. of colorless prisms, identical with the product of IV, Example 1C was obtained.

Example 4

3 - beta - 5-alpha-dihydroxy-6-beta-methylpregnan-20-one (10 g.) was added to 25 ml. of pyridine and 8 ml. of acetic anhydride and stirred (magnetic stirrer) overnight at 45° C. 5 ml. of water was added slowly under sufficient cooling to keep the temperature at 40 to 45° C. for 45 minutes. The desired 3-acetate was then precipitated by pouring the mixture into one liter of ice water. The resulting crystals were collected by filtration, washed well with distilled water and dried at 105°. There was obtained 10.5 g. of 3-monoacetate, which was dissolved in 200 ml. 2-methyl-2-ethyl-1,3-dioxolane, 400 mg. para-toluene-sulfonic acid monohydrate added and distilled slowly for 5 hours through a packed column. By this time the temperature of the mixture on top of the column was found to be the boiling point of the dioxolane (117°), indicating that the reaction was complete. Further evidence was obtained by refractometric analysis of the distillation, which showed that a ratio of 2 moles of butanone had been removed during the reaction period. It is a known fact that ketalization of a carbonyl group by interchange with 2-methyl-2-ethyl-1,3-dioxolane produces a one mol ratio of butanone. Elimination of water from the 5-alpha-hydroxy gives rise to an additional mol of butanone.

The resulting mixture containing 6-methylpregnenolone acetate was worked up by washing it twice with 10% potassium carbonate solution, then with water. Drying over sodium sulfate and concentration to dryness in a water bath under reduced pressure gave an oily residue, the IR spectrum of which agreed with the structure of 3-beta - acetoxy-6-methylpregn-5-en-20-one 20-ethylene ketal. The oily residue was heated for 30 minutes with 250 ml. of methanol containing 2.5 g. of potassium hydroxide. Addition of 1 ml. of acetic acid and concentration to a small volume gave a crystalline precipitate, which was filtered, washed with water and a little methanol to give 8 g. of 6-methylpregnanolone 20-ethylene ketal in all respects identical with the substance described in Example 3C.

Example 5

3-BETA-ACETOXY-6-ALPHA-METHYLPREGN-4-EN-20-ONE 20-ETHYLENE KETAL

The procedure of Example 2 was repeated but substituting 3-beta-hydroxy-6-alpha-methylpregn-4-en-20-one 20-ethylene ketal of Example 3C instead of Compound IV, and the acetylation product obtained was the corresponding 20-ethylketal-3-acetate of Compound IV. Other 3-acyl esters of the 20-ketal can be formed by the same procedure.

The anti-ovulatory activity of 6-methyl-3-beta-hydroxy-pregn-4-en-20-one was tested in female rabbits in a group of tests presented in Table I following the method reported by Pincus and Chang, M. C. Acta, Physiol., Latino Americano 3; 117, 1953; and Pincus, Proc. Fifth International Conference on Planned Parenthood, 1955, p. 176.

The compound was found to be active by both the subcutaneous and oral routes. Complete suppression of ovulation was obtained by the subcutaneous use of 2 mg. and significant reductions were found with doses of as little as 0.016 mg. The compound also produced significant ovulation inhibition when administered orally at a dosage of 0.016 mg.

Both the 20-ethylene ketal and the 3-beta-acetoxy 20-ethylene ketal of 6-alpha-methylpregn-4-en-20-one were active in the anti-ovulation assay of Pincus and Chang (1953) at subcutaneous dose levels of 0.03 mg. and oral dose levels of 0.05 mg. Complete ovulation suppression was obtained at the 2 mg. dose levels by both routes.

TABLE I

*Anti-Ovulatory Activity of 6-Alpha-Methyl 3-Beta-Hydroxy Pregn-4-En-20-One*

Conditions:
1. Administration of test compound at 0 hour to a postpartum female rabbit.
2. At 18–24 hours treated female rabbit is mated with a rabbit of known fertility.
3. One day after mating ovaries are inspected for rupture points at laporatomy.

| Route of Administration | Total Dose of Compound mg. | No. of Female Rabbits | Rabbits Showing Ovulation Points, Percent |
|---|---|---|---|
| Subcutaneous Injection | 0.0032 | 5 | 60 |
| | 0.0064 | 4 | 50 |
| | 0.016 | 5 | 20 |
| | 0.08 | 5 | 20 |
| | 0.4 | 5 | 20 |
| | 2.0 | 5 | 0 |
| | 10.0 | 5 | 0 |
| Oral | 0.0032 | 5 | 100 |
| | 0.016 | 5 | 40 |
| | 0.08 | 5 | 40 |
| | 0.4 | 5 | 40 |
| | 2.0 | 5 | 20 |

Table II compares the progestational activity of Compound IV with progesterone in a progestational assay based on the carbonic anhydrase content of estrogen primed uterus by the method defined by Pincus et al. (Endocrinology 61: 528, 1957). The results indicate that the 6-alpha methyl steroid administered subcutaneously is some three as active as progeserone as a progestational agent. The steroid also showed significant oral activity at the 0.4 mg. dose.

TABLE II

*The Progestational Activity of 6-Alpha-Methyl-3-Beta-Hydroxypregn-4-En-20-One (6a–M)*

| Material Administered | Total Dose mg. (Route) | No. of Rabbits | Carbon Anhydrase Concentration, Uterus E.U. per Gram/S.E. | |
|---|---|---|---|---|
| 0 | 0 | 10 | 67 | 6.5 |
| Progesterone | 0.5 | 4 | 359 | 37 |
| | 1.0 | 6 | 594 | 60 |
| 6a–M | 0.1 (Sub. Inc.) | 4 | 203 | 57 |
| | 0.4 (Sub. Inj.) | 4 | 516 | 20 |
| | 0.1 (Oral) | 4 | 114 | 36 |
| | 0.4 | 4 | 103 | 6 |

The corresponding acyl esters of Compound IV were found to have only a slightly greater activity than progesterone. However, the progestational activity was prolonged for a substantially longer period as shown in our copending parent application, Serial Number 721,371, now U.S. Patent 3,061,606.

The compounds in useful dosage levels from about 0.016 mg. to about 3 mg. per kg. body weight can be made up as pills for use orally; or as a liquid or jelly for injection subcutaneously by distributing the compounds in a liquid or gelatinous solid therapeutically acceptable carrier. It can be dissolved in an edible fixed oil such as peanut oil, cotton seed oil, corn oil or the like; in a solid gelatinous or waxy carrier such as lard, hydrogenated fixed oils, stearic cocoa butter, aluminum stearate or other usually fatty carriers for injectibles; or it can be formed into pills with such solid carriers as starch, sugar, bentonite, silica gel, alumina and other common carriers for orally administered medicaments and will be distributed therein homogeneously in quantity convenient to supply a dosage in the range stated, of about 0.016 to 3.0 mg. per kg. body weight, usually distributed in a concentration in a carrier sufficient to apply the dosage in a 0.1 to 2 cc. for injection; or 1 to 2 tablets taken orally where the carrier is a dry carrier for oral administration.

We claim:

1. A compound having the formula

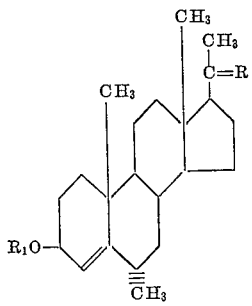

wherein R is a radical selected from the group consisting of oxygen and lower alkylene ketal, and $R_1$ is selected from the group consisting of hydrogen and hydrocarbon acyl having from 1 to 10 carbon atoms.

2. A compound having the formula

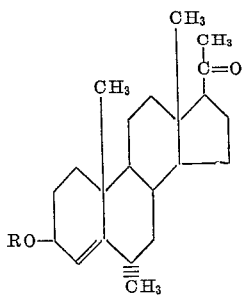

wherein R is a hydrocarbon acyl radical having 1 to 10 carbon atoms.

3. A compound having the formula

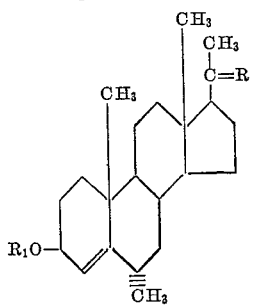

wherein R is ethylene ketal and $R_1$ is a hydrocarbon acyl radical having 1 to 10 carbon atoms.

4. 3-beta-hydroxy-6-alpha-methyl-pregn-4-en-20-one.
5. 3-beta-hydroxy-6-alpha - methyl - pregn-4-en-20-one 20-ethylene ketal.
6. 3-beta - 17 - alpha, 20-trihydroxy-6-alpha-methyl-pregn-4-ene 3,20-diacetate.
7. 3-beta-acetoxy-6-alpha-methyl-17-isopregn-4-en - 20-one.
8. 3-beta-hydroxy-6-alpha - methylpregn-4-en-20-one in a therapeutically acceptable carrier.
9. The process of forming 3-beta-hydroxy-6-alpha-methyl-pregn-4-en-20-one comprising reducing 6-alpha-methyl-17-alpha-acetoxy progesterone, acylating the reduction product to the 3-beta-6-alpha-methyl-pregn-4-en-20-diacyloxy-17-alpha-hydroxy derivative, treating the product in a Serini-Logemann reaction to form 3-beta-acyloxy-6-alpha-methyl-17-isopregn-4-en-20-one, and then isomerizing to 3-beta-hydroxy-6-alpha-methyl-pregn-4-en-20-one.
10. The method of forming 3-beta-hydroxy-6-alpha-methyl-pregn-4-en-20-one 20-lower alkylene ketal, comprising converting a 6-methyl-pregnenolone to its 20-lower alkylene ketal, oxidizing the said ketal to the 6-epimeric mixture of 6-methylprogesterone 20-lower alkylene ketals, equilibrating the said mixture in an alcoholic solvent containing an organic base to form substantially pure 6-alpha-methylprogesterone 20-lower alkylene ketal epimer, and reducing the ketal obtained to 3-beta-hydroxy-6-alpha-methyl-pregn-4-en-20-one 20-lower alkylene ketal.
11. The method of forming 3-beta-hydroxy-6-alpha-methylpregn-4-en-20-one comprising converting 6-methylpregnenolone to its 20-lower alkylene ketal, oxidizing the said ketal to a 6-epimeric mixture of 6-methylprogesterone 20-lower alkylene ketals, equilibrating the said mixture in an alcoholic solvent containing an organic base to form substantially pure 6-alpha-methylprogesterone 20-lower alkylene ketal epimer, and reducing the ketal epimer to 3-beta-hydroxy-6-alpha-methyl-pregn-4-en-20-one 20-lower alkylene ketal, and then hydrolyzing off the 20-lower alkylene ketal group.
12. The method of forming 3-beta-acyloxy-6-alpha-methylpregn-4-en-20-one in which the 3-beta acyl group is a carboxylic acyl having 1 to 10 carbon atoms, comprising converting 6-alpha-methylpregnenolone to its 20-lower alkylene ketal, oxidizing the said ketal to a 6-epimeric mixture of 6-methylprogesterone 20-lower alkylene ketals, equilibrating the said mixture in an alcoholic solvent containing an organic base to form substantially pure 6-alpha-methylprogesterone 20-lower alkylene ketal epimer, reducing the ketal epimer to 3-beta-hydroxy-6-alpha-methyl-pregn-4-en-20-one 20-lower alkylene ketal, hydrolyzing off the 20-lower alkylene ketal, and then acylating the 3-beta hydroxy group with a carboxylic acyl having 1 to 10 carbon atoms.

References Cited in the file of this patent

FOREIGN PATENTS

| 802,004 | Great Britain | Sept. 24, 1958 |
| 802,005 | Great Britain | Sept. 24, 1958 |

OTHER REFERENCES

Gut: J.O.C. 21, pages 1327–1328 (1956).
Burn et al.: J.C.S. (London), pages 4092–4098, September 1957.
Petrow et al.: Chem. Soc. Jour., 1959, pp. 3595–97.
Fieser et al.: Steroids, 1959 ed., pp. 692–693, Reinhold Pub. Co., N.Y.